US008553751B2

(12) United States Patent  
Kobayashi (10) Patent No.: US 8,553,751 B2  
(45) Date of Patent: Oct. 8, 2013

(54) RADIO EQUIPMENT CONTROLLER, RADIO CONTROL METHOD, RADIO STATION, AND RADIO COMMUNICATION SYSTEM

(75) Inventor: Shinichiro Kobayashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/409,808

(22) Filed: Mar. 1, 2012

(65) Prior Publication Data

US 2012/0236916 A1  Sep. 20, 2012

(30) Foreign Application Priority Data

Mar. 18, 2011  (JP) .................................. 2011-061776

(51) Int. Cl.
*H04B 1/38* (2006.01)
(52) U.S. Cl.
USPC ........... 375/224; 375/257; 375/260; 375/295; 375/316; 375/340; 455/279.1; 455/282; 455/284; 370/210; 370/445; 370/480; 379/27.01
(58) Field of Classification Search
USPC ................. 375/224, 257, 260, 295, 316, 340; 455/279.1, 282, 284; 370/210, 445, 480; 379/27.01
See application file for complete search history.

(56) References Cited

U.S. PATENT DOCUMENTS

| 2009/0257411 | A1 | 10/2009 | Shitara |
| 2009/0257427 | A1 | 10/2009 | Shitara |
| 2009/0300454 | A1* | 12/2009 | Miyoshi et al. ............... 714/748 |
| 2009/0323642 | A1 | 12/2009 | Tanno et al. |
| 2011/0228831 | A1* | 9/2011 | Hirata ........................... 375/224 |

FOREIGN PATENT DOCUMENTS

| JP | 2007-221743 | 8/2007 |
| JP | 2009-182989 | 8/2009 |
| JP | 2001-110016 | 5/2010 |

* cited by examiner

*Primary Examiner* — Leon Flores  
(74) *Attorney, Agent, or Firm* — Katten Muchin Rosenman LLP (57) ABSTRACT

A radio equipment controller includes a calculator that calculates a delay amount by subtracting from a given maximum delay amount an internal delay amount of a radio equipment and a delay amount of a cable, the radio equipment modulating and transmitting orthogonal frequency division multiplexing (OFDM) symbols, and the cable connecting the radio equipment and the radio equipment controller that creates the OFDM symbols, a detector that detects a beginning of the OFDM symbols from data that is inputted into a buffer that stores data of the OFDM symbols, and a delay controller that determines a transmission timing of the OFDM symbols so that the transmission timing of the beginning of the OFDM symbols becomes a timing that is delayed by the calculated delay amount after a reference signal with a specific period.

13 Claims, 10 Drawing Sheets

RADIO EQUIPMENT CONTROLLER, RADIO CONTROL METHOD, RADIO STATION, AND RADIO COMMUNICATION SYSTEM

CROSS-REFERENCE TO RELATED APPLICATION

This application is based upon and claims the benefit of priority of the prior Japanese Patent Application No. 2011-061776, filed on Mar. 18, 2011, the entire contents of which are incorporated herein by reference.

FIELD

The embodiments discussed herein are related to a radio equipment controller, a radio control system, a radio station, and a radio communication system.

BACKGROUND

A radio base station including a radio equipment controller (REC) and radio equipment (RE) is an apparatus that emits and receives radio waves to secure a communication line with a mobile terminal, for example. The REC is a device that, for example, creates IQ data to be transmitted and transmits the IQ data to the RE. The RE being a device that transmits and receives radio waves to and from a mobile terminal, modulates the IQ data and transmits the IQ data to the mobile terminal.

SUMMARY

According to an aspect of the invention, a radio equipment controller includes a calculator that calculates a delay amount by subtracting from a given maximum delay amount an internal delay amount of a radio equipment and a delay amount of a cable, the radio equipment modulating and transmitting orthogonal frequency division multiplexing (OFDM) symbols, and the cable connecting the radio equipment and the radio equipment controller that creates the OFDM symbols, a detector that detects a beginning of the OFDM symbols from data that is inputted into a buffer that stores data of the OFDM symbols, and a delay controller that determines a transmission timing of the OFDM symbols so that the transmission timing of the beginning of the OFDM symbols becomes a timing that is delayed by the calculated delay amount after a reference signal with a specific period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a radio equipment controller and a radio control method described hereinafter will be explained with reference to the drawings.

While inventing the present embodiments, observations were made regarding a related art. Such observations include the following, for example.

A radio base station in the related art includes a REC and RE. The REC is connected to multiple REs with a common public radio interface (CPRI) that is constituted of a layer 1 and a layer 2 that are protocol interface standard specifications. User plane data, control and management data, and synchronization data are multiplexed and transmitted and received with the CPRI. Among these types of data, the REC maps the IQ data onto the user plane data and transmits the data to the RE.

Here, antenna data for all sectors is transmitted at the same time, that is, the REs transmit radio waves at the same time, for the purpose of implementing a multimedia broadcast and multicast service (MBMS). Accordingly, the REC desirably absorbs delays caused by cable lengths and devices and the like when transmitting the IQ data to the REs.

Generally, the REC includes a baseband signal processing unit and a CPRI terminal unit. The REC creates IQ data using the baseband signal processing unit and converts the IQ data from electrical signals to optical signals with the CPRI terminal unit when sending the IQ data to the REs. The REC absorbs processing delay fluctuations generated in the REC and further adds an optical cable delay amount and an RE device internal delay amount to allow the antenna data of all the sectors to be transmitted to the REs at the same time from the antenna terminals.

To absorb such fluctuations, a method employing a phase locked loop (PLL) is used in the baseband signal processing unit to even out the delay amounts between the sectors by using a clock with frequencies synchronized to the CPRI. When the clock used by the baseband signal processing unit and the CPRI clock are asynchronous, a method of evening out the delay amounts between the sectors by adding a control signal that indicates a frame beginning at the beginning of the IQ data is employed.

When an analog circuit such as a PLL is used, there is a problem in that new bit lines are increased when new control signals are added to the IQ data thus reducing the accuracy of processing for absorbing the delay amounts.

Embodiment 1

Effects of the overall configuration of a system including the radio base station, a configuration of the devices that make up the system, and a processing flow will be described in the first embodiment. The number of radio equipment controllers (REC) and radio equipment (RE) devices and the system configuration exemplified herein are merely examples and the present disclosure is not limited to the embodiments discussed herein.

[Overall Configuration]

Figure 1:
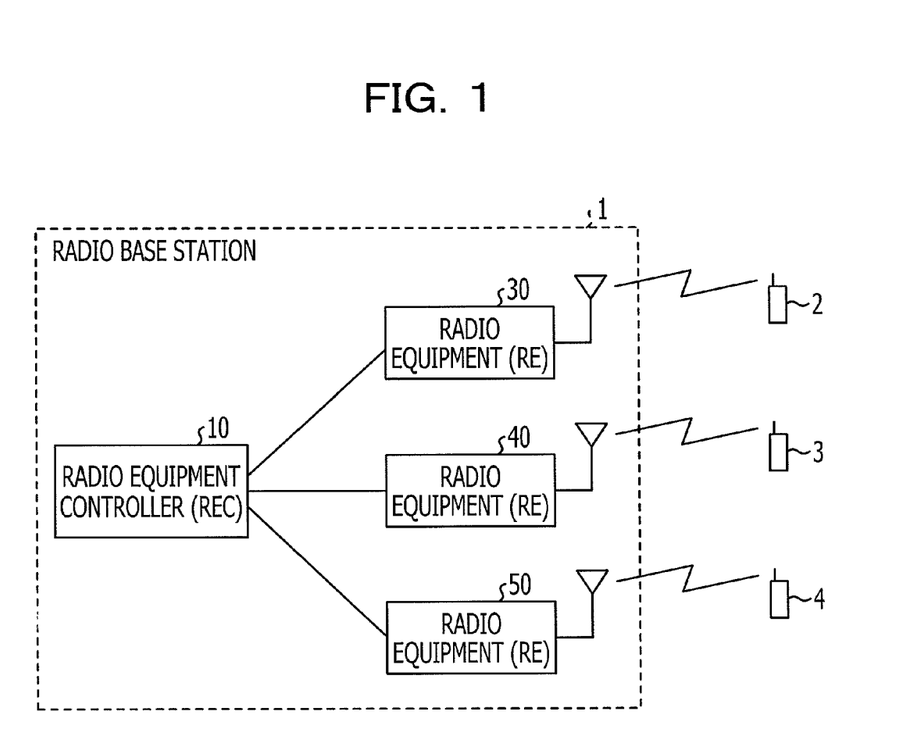
FIG. 1 illustrates an overall configuration of a system including a radio base station according to a first embodiment.

FIG. 1 illustrates an overall configuration of a system including a radio base station according to the first embodiment. As illustrated in FIG. 1, the system includes a radio base station 1 and mobile terminals 2 to 4 that are communicably connected by radio. The radio base station 1 includes a radio equipment controller (REC) 10, and radio equipment (RE) 30, 40, and 50. The REC 10 and the REs are devices that conform to CPRI and are connected by optical cables. In the first embodiment, delay amounts in which OFDM symbols are delayed inside the optical cables connecting the REC 10 and the REs are assumed to stay the same, and delay amounts in which OFDM symbols are delayed inside each RE are also assumed to stay the same.

The REC 10 is a device that creates OFDM symbols corresponding to each sector and transmits the OFDM symbols to the REs. The REs are devices that modulate the OFDM symbols received from the REC 10 and transmit the OFDM symbols from antennas. For example, the RE 30 transmits and receives radio waves to and from the mobile terminal 2, the RE 40 transmits and receives radio waves to and from the mobile terminal 3, and the RE 50 transmits and receives radio waves to and from the mobile terminal 4.

The mobile terminals may be, for example, portable telephones, smart phones, PDAs, or personal computers having a radio function. Each of the mobile terminals establish radio communication with the RE that manages the mobile terminal to transmit and receive radio waves.

In these conditions, the REC 10 includes a buffer that retains OFDM symbol data. The REC then calculates a delay amount by subtracting an internal delay amount inside the RE 30 and a delay amount of the cable connecting the REC 10 and the RE 30 from a given maximum delay amount. The REC 10 then determines a transmission timing of the OFDM symbols so that the timing is delayed by the calculated amount after a reference signal with a specific cycle of the transmission timing of the detected OFDM symbol beginning.

Specifically, the REC 10 extracts the OFDM symbol beginning and stores an OFDM delay amount after the reference signal in the buffer to determine the transmission timing to the REs. The REs modulate the OFDM symbols received from the REC 10 and transmit the OFDM symbols to the mobile terminals. As a result, the OFDM symbols created by the REC 10 are transmitted at the same time from the REs.

In this way, the radio base station 10 may absorb fluctuations inside the REC, delay amounts in the REs, and cable delay amounts without using an analog circuit such as a PLL and without adding a new control signal to the IQ data. Therefore, the delay amounts may be absorbed accurately to allow for improved reliability and stability of the overall system.

[Configurations of Devices]

Figure 2:
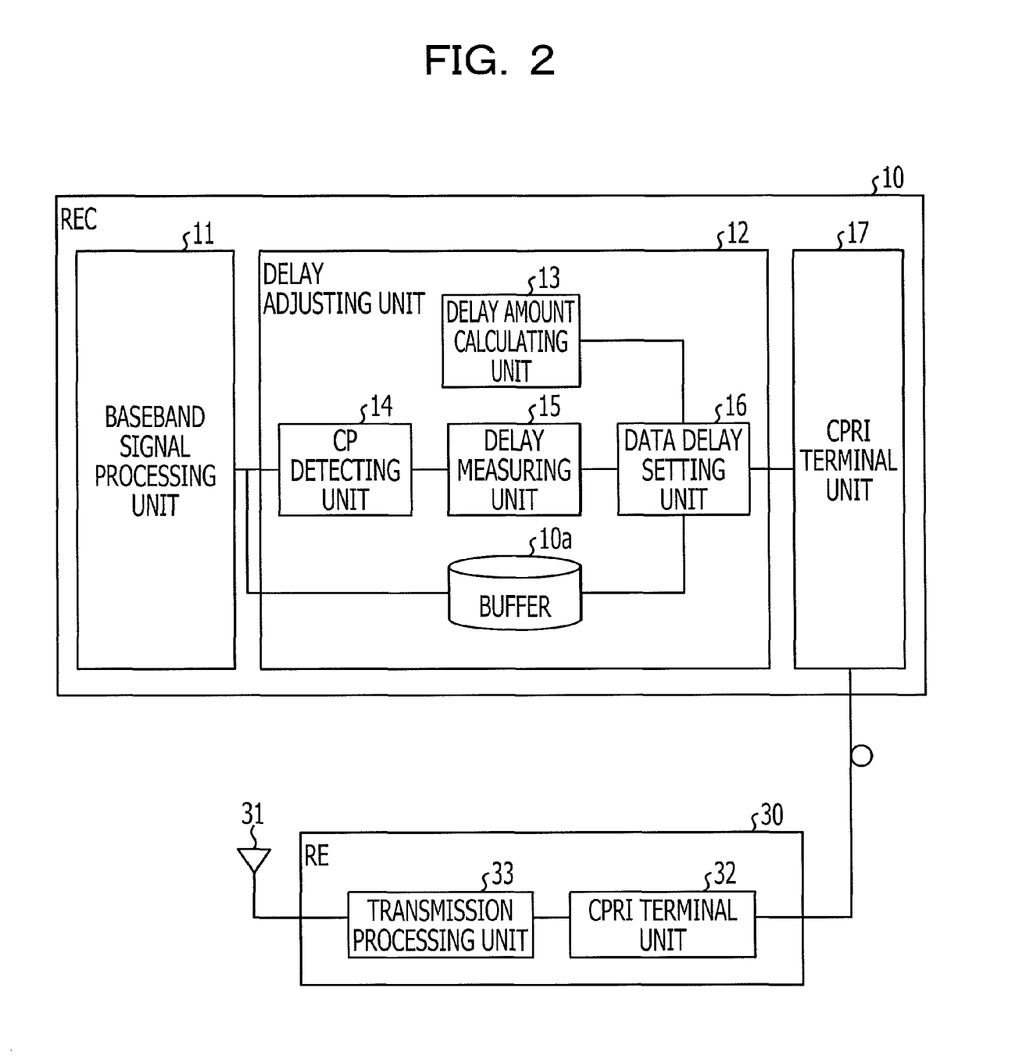
FIG. 2 is a block diagram of a configuration of the radio base station according to the first embodiment.

FIG. 2 is a block diagram of a configuration of the radio base station according to the first embodiment. As illustrated in FIG. 2, the radio base station 1 includes the REC 10 and the REs. The REs each have similar configurations and therefore the following explanation will use the RE 30 as an example.

[REC Configuration]

As illustrated in FIG. 2, the REC 10 includes a baseband signal processing unit 11, a delay adjusting unit 12, and a CPRI terminal unit 17. The control units described herein are merely examples and other control units and memory units may be included.

The baseband signal processing unit 11 conducts processing such as serial-parallel conversion, IQ mapping, inverse Fourier transform, CP insertion and the like to create OFDM symbols and then transmits the OFDM symbols to the delay adjusting unit 12. For example, the baseband signal processing unit 11 divides a transmission data series into sub-carriers and uses a modulation system such as quadrature phase shift keying (QPSK) to conduct primary modulation on each sub-carrier.

The baseband signal processing unit 11 conducts inverse fast Fourier transform (IFFT) to convert the sub-carrier signals that underwent the primary modulation from high frequency components to time axis components. Next, the baseband signal processing unit 11 copies a fixed period at the end of an IFFT signal column obtained by the inverse fast Fourier transform, then conducts a CP insertion to be added to the end of the IFFT signal column to create OFDM symbols formed from the CP and effective symbols. The baseband signal processing unit 11 then outputs the created OFDM symbol to the delay adjusting unit 12. The processing conducted by the baseband signal processing unit 11 is not limited to the examples described herein, and processing similar to the baseband signal processing conducted in conventional REC devices may be conducted.

The delay adjusting unit 12 is a processing unit that adjusts a delay amount that includes internal delays of the REC 10, internal RE delays, and cable delays and the like, of the OFDM symbols created by the baseband signal processing unit 11. The delay adjusting unit 12 includes a buffer 10a, a delay amount calculating unit 13, a CP detecting unit 14, a delay measuring unit 15, and a data delay setting unit 16. The delay adjusting unit 12 receives a global positioning system (GPS) radio frame and the like to create a reference signal synchronized with the radio frame.

The buffer 10a is a storage unit that retains data from the OFDM symbol beginning data. For example, the buffer 10a includes a region that may retain a maximum delay amount, and retains OFDM symbol IQ data outputted by the baseband signal processing unit 11.

The delay amount calculating unit 13 calculates a delay amount by subtracting an internal delay amount of the RE 30 and a delay amount of the cable connecting the REC 10 and the RE 30 from a given maximum delay amount. For example, the delay amount calculating unit 13 measures the internal delay amount of the RE 30 and the delay amount of the cable connecting the REC 10 and the RE 30. Since a common method may be used for the measuring method, a detailed explanation thereof will be omitted. However, a given measurement value may be stored in a memory so that the stored measurement value may be used. The maximum delay amount is the largest delay amount that is permitted in the system illustrated in FIG. 1, and is set by an administrator and the like.

As an example, the delay amount calculating unit 13 subtracts the RE 30 internal delay amount "10" and the optical cable delay amount "50" from the maximum delay amount "200" to obtain "175," and then outputs the calculated amount as a delay amount to be used for adjustment to the data delay setting unit 16.

The CP detecting unit 14 detects a CP from downlink IQ sampling data and then outputs the detection result to the delay measuring unit 15. For example, the CP detecting unit 14 detects the OFDM symbol CP from data inputted into the buffer 10a and outputs the fact of the detection to the delay measuring unit 15.

As an example, the CP detecting unit 14 compares the IQ data stored in the buffer 10a with data corresponding to the IQ data stored in the buffer 10a that has been delayed by a specific offset amount. The OFDM symbol length and the CP length are previously stored in a memory and the like by an administrator and the like. Specifically, the CP detecting unit 14 determines that CP source data has been detected when the IQ data inputted by the baseband signal processing unit 11 matches the IQ data stored in the beginning of the buffer 10a, and then outputs the fact of the detection to the delay measuring unit 15. Next, the CP detecting unit 14 determines whether or not subsequent IQ data inputted by the baseband signal processing unit 11 matches the second stored IQ data from the buffer 10a beginning.

Meanwhile, if the IQ data does not match, the CP detecting unit 14 determines whether or not the subsequent IQ data inputted by the baseband signal processing unit 11 matches IQ data to be subsequently stored in the buffer 10a beginning. In this way, the CP detecting unit 14 detects the data that is the source of the CP by consecutively comparing the IQ data inputted by the baseband signal processing unit 11.

Returning to FIG. 2, the delay measuring unit 15 measures the delay amount in OFDM units created by the baseband signal processing unit 11 by detecting OFDM symbol boundaries based on the CP detecting unit 14 detection result. For example, the delay measuring unit 15 detects the IQ data stored in the buffer 10a subsequent to the detected CP source data as the OFDM symbol beginning when a number of notifications of detections of the CP source data by the CP detecting unit 14 becomes the CP length portion. Specifically, the delay measuring unit 15 determines a period from when the inputting of the IQ data into the delay adjusting unit 12 was started until the above timing as the delay amount, or in other words the fluctuation, created by the baseband signal processing unit 11. The delay measuring unit 15 then reports the detected OFDM symbol beginning to the data delay setting unit 16.

The data delay setting unit 16 adds the delay amounts to the OFDM symbols so that the transmission timing after the delay amount measured by the delay measuring unit 15, the optical cable delay amount, and the RE internal delay amount are added becomes fixed as the system maximum delay amount at the RE terminals. For example, the data delay setting unit 16 determines the transmission timing of the OFDM symbols so that the transmission timing is delayed by the amount calculated by the delay amount calculating unit 13 after the reference signal with the specific cycle of the transmission timing of the OFDM symbol beginning detected by the delay measuring unit 15. The data delay setting unit 16 then outputs the delay adjusted OFDM symbols at the determined transmission timing to the CPRI terminal unit 17.

The CPRI terminal unit 17 converts the delay adjusted OFDM symbols received from the data delay setting unit 16 to optical signals and transmits the converted OFDM symbols to the RE 30.

[RE Configuration]

As illustrated in FIG. 2, the RE 30 has a configuration similar to a typical RE, and includes, for example, an antenna 31, a CPRI terminal unit 32, and a transmission processing unit 33. The RE is not limited to the control units indicated in FIG. 2 and has a configuration similar to a typical RE device.

The antenna 31 transmits and receives data to and from mobile terminals. For example, the antenna 31 transmits radio waves with modulated OFDM symbols received from the REC 10, in other words, downlink signals, to the mobile terminals. The antenna 31 receives radio waves, in other words, uplink signals, from the mobile terminals.

The CPRI terminal unit 32 converts the OFDM symbols received from the REC 10 from optical signals to electric signals, and outputs the converted electrical signals to the transmission processing unit 33. The OFDM symbols outputted to the transmission processing unit 33 at this time are in a state in which the optical cable delay amount adjusted by the REC 10 is canceled out.

The transmission processing unit 33 conducts frequency conversion of the OFDM symbols received from the CPRI terminal unit 32, and transmits the converted OFDM symbols from the antenna 31 to the mobile terminals. The RE internal delay amounts among the delay amounts adjusted by the REC 10 in the OFDM signals at this time are canceled out when the OFDM signals are outputted from the antenna 31.

[Exemplary Circuit Configuration of Delay Processing Unit]

Figure 3:
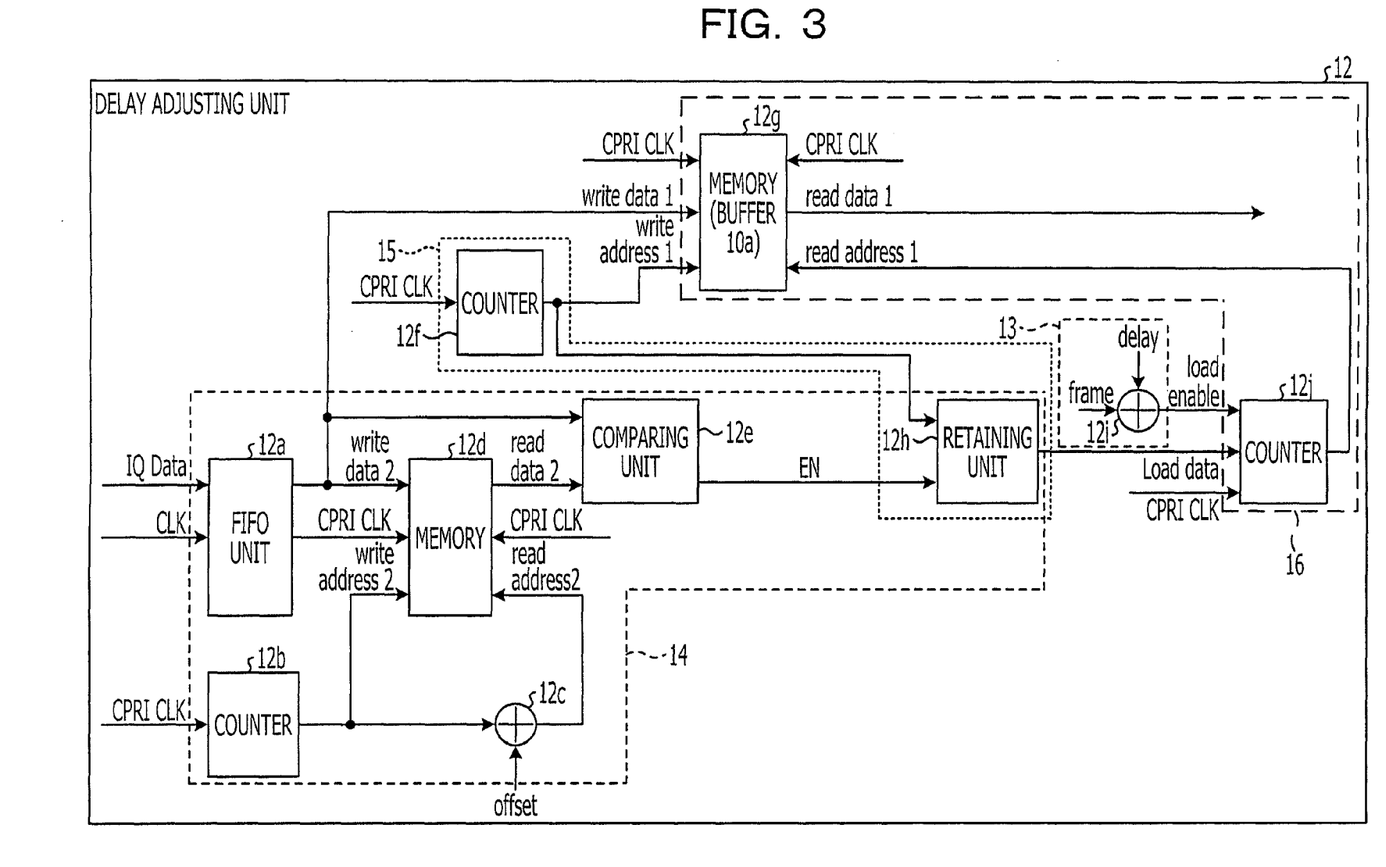
FIG. 3 is an exemplary circuit configuration of a delay adjusting unit according to the first embodiment.

Next, an exemplary circuit configuration and data flow of the delay adjusting unit 12 illustrated in FIG. 2 will be described with reference to FIG. 3. FIG. 3 is an exemplary circuit configuration of a delay adjusting unit according to the first embodiment. As illustrated in FIG. 3, the delay adjusting unit 12 includes a first-in first-out (FIFO) unit 12a, a counter 12b, an adding unit 12c, a memory 12d, a comparing unit 12e, a counter 12f, a memory 12g, a retaining unit 12h, an adding unit 12i, and a counter 12j.

The delay amount calculating unit 13 illustrated in FIG. 2 corresponds to the adding unit 12i. Similarly, the CP detecting unit 14 corresponds to the FIFO unit 12a, the counter 12b, the adding unit 12c, the memory 12d, the comparing unit 12e, and the retaining unit 12h. Similarly, the delay measuring unit 15 corresponds to the counter 12f and the retaining unit 12h. Similarly, the data delay setting unit 16 corresponds to the memory 12g and the counter 12j.

The FIFO unit 12a is a FIFO circuit that synchronizes inputted IQ data to a CPRI clock (CPRI CLK) that is synchronized to a radio frame such as a GPS frame and the like. An asynchronous clock (CLK) that is not synchronized with the CPRI CLK is inputted to the FIFO unit 12a. IQ data outputted from the baseband signal processing unit 11 and that is synchronized with the CLK is inputted in the FIFO unit 12a.

The FIFO unit 12a outputs the CPRI CLK to the memory 12d. IQ data that has been switched from the CLK to the CPRI CLK is outputted by the FIFO unit 12a to the memory 12g as write data 1. Similarly, IQ data that has been switched from the CLK to the CPRI CLK is outputted by the FIFO unit 12a to the memory 12d as write data 2.

The counter 12b receives the CPRI CLK and counts a CP length portion. The counter 12b starts to count in synchronization with the reference signal (frame). The counter 12b outputs a counted value to the memory 12d as the memory 12d write address 2. Specifically, write data 2 is written into a write address 2 region in the memory 12d. The counter 12b outputs the write address 2 to the adding unit 12c.

The adding unit 12c outputs a value derived by adding the write address 2 received from the counter 12b and an offset value, to the memory 12d as a memory 12d read address 2. The offset value is a value derived by subtracting the CP length from the OFDM symbol length.

The memory 12d is a memory unit that retains the IQ data outputted by the baseband signal processing unit 11 as the CP length. The memory 12d receives the CPRI CLK from the FIFO unit 12a. The write data 2 outputted by the FIFO unit 12a is written into a region of the write address 2 created by the counter 12b in the memory 12d. The read data 2 is read out by the comparing unit 12e from the read address 2 region created by the adding unit 12c.

The comparing unit 12e continuously compares the CP length portion data to determine matches and non-matches to detect the OFDM symbol CP and identify the OFDM symbol boundary. For example, the comparing unit 12e compares the read data 2 read out from the memory 12d with the read address 2, and the write data 2 outputted from the FIFO unit 12a to determine whether or not the read data 2 and the write data 2 match. The comparing unit 12e then outputs an enable signal to the retaining unit 12h when the number of matches of the data becomes the CP length portion. As an example, if the CP length is "16," the comparing unit 12e outputs the enable signal to the retaining unit 12h when the number of matches reaches "16" times in succession.

The counter 12f counts a write address 1 of the memory 12g. The counter 12f receives the CPRI CLK and starts to count in synchronization with the reference signal (frame). The counter 12f outputs the counted value to the memory 12g and the retaining unit 12h as a write address 1.

The memory 12g is a memory unit that retains the IQ data outputted by the baseband signal processing unit 11 as the maximum delay amount, and receives the CPRI CLK. Write data 1 outputted by the FIFO unit 12a is written into a write address 1 created by the counter 12f in the memory 12g.

The retaining unit 12h retains the write address 1 of the memory 12g received from the counter 12f at the time that the enable signal is received from the comparing unit 12e. The retained address becomes an address storing the OFDM symbol beginning data. The retaining unit 12h outputs the retained write address 1 to the counter 12j as load data.

The adding unit 12i outputs to the counter 12j a load enable that indicates a timing in which a delay amount, which is derived by subtracting the optical cable length delay and RE internal delay from the maximum delay amount of the entire system, is added to the reference signal (frame).

The counter 12j uses the write address 1 received from the retaining unit 12h to read out read data 1 from the memory 12g at the timing when the load enable is received from the adding unit 12i. Specifically, the counter 12j adjusts the OFDM symbol read out as an initial value of the write address 1 by a delay adjustment amount in which the load enable portion is subtracted from the maximum delay amount. As a result, the OFDM symbols may be outputted from the RE terminals in synchronization.

[Specific Example (Time Chart)]

Figure 4:
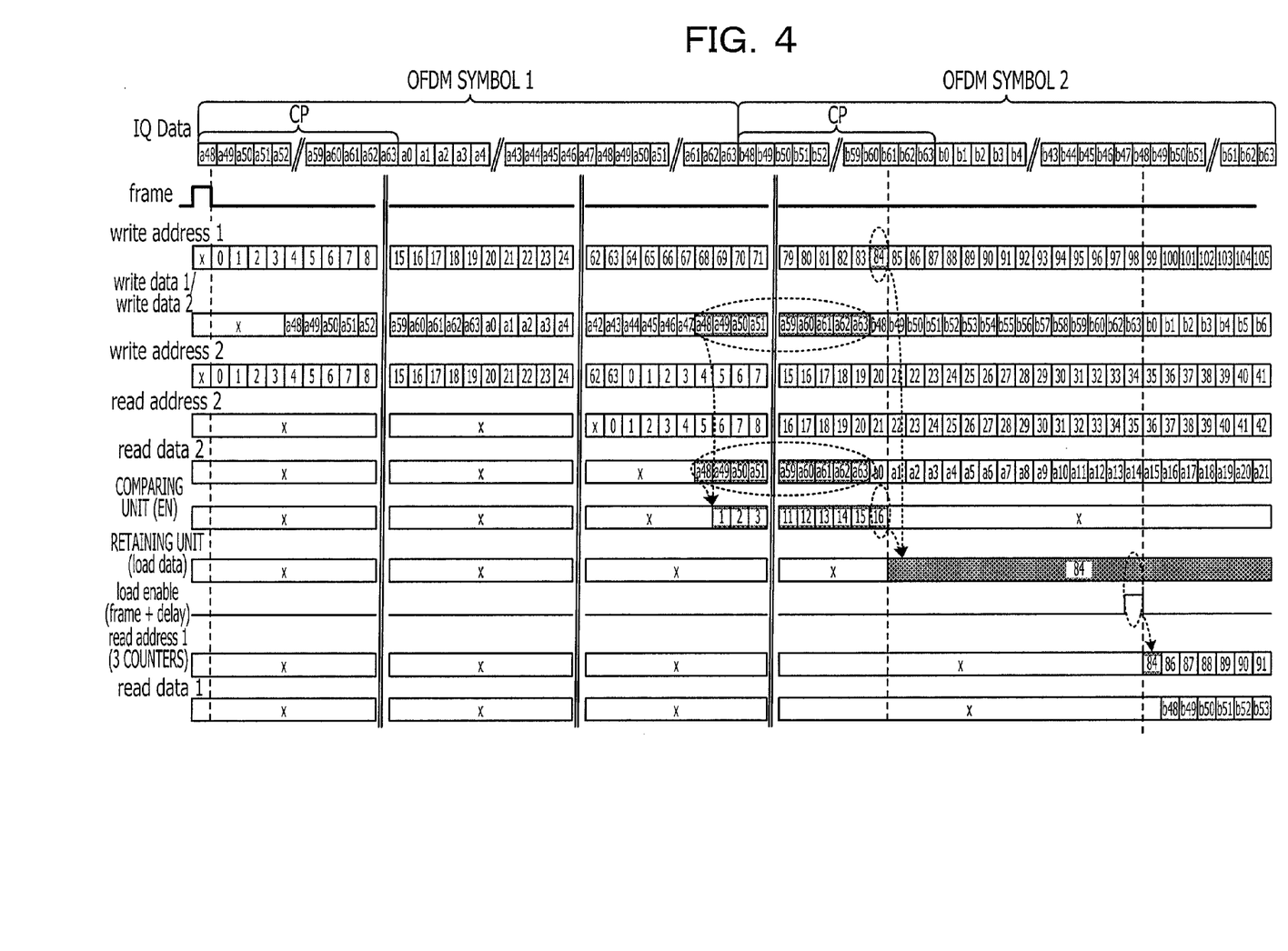
FIG. 4 is a time chart of delay adjusting processing according to the first embodiment.

Next, a specific example of processing conducted by the delay adjusting unit 12 of the REC 10 will be explained using the circuit example illustrated in FIG. 3. FIG. 4 is a time chart of delay adjusting processing according to the first embodiment.

An OFDM symbol 1 is OFDM data represented by effective symbols a0 to a63 and CPs a48 to a63. An OFDM symbol 2 is OFDM data represented by effective symbols b0 to b63 and CPs b48 to b63. Specifically, the OFDM symbol length is 80, the CP length is 16, and the offset length is 64. The beginning data is assumed to begin from smaller numbers. In other words, a0 represents the beginning of the effective symbols, with the next symbol being a1, and the last symbol being a63.

In this state, the counter 12b and the counter 12f start to count in synchronization with the reference signal. That is, the counter 12b and the counter 12f begin to count when the IQ data is inputted by the FIFO unit 12a and the IQ data is synchronized to the CPRI CLK. For example, since the counter 12b counts the CP length portions, the counter 12b counts in order from 0 to 63 and then starts to count again from 0 after reaching 63. Since the counter 12f counts the maximum delay portions, the counter 12f counts in order from 0 to the maximum delay amount (200).

The value counted by the counter 12f is used as the write address 1 in the memory 12g write address. The value counted by the counter 12b is used as the write address 2 in the memory 12d write address.

Although IQ data "a48" is written in the region write address 1=0 in a normal state if there is no effect from a delay on the inputted IQ data, the inputted IQ data is affected by the REC internal delay. Therefore, the FIFO unit 12a writes blank data "x" instead of writing data in the memory 12g from write address 1=0 to write address 1=3. Similarly, the FIFO unit 12a writes blank data "x" instead of writing data in the memory 12d from write address 2=0 to write address 2=3.

The FIFO unit 12a then writes the OFDM symbol beginning IQ data "a48" into the memory 12g write address 1=4 region. From this point, the FIFO unit 12a subsequently writes the inputted data into the memory 12g write address 1 regions. As an example, the FIFO unit 12a writes the subsequently inputted ID data "a47" into the memory 12g write address 1=5 region. Next, the FIFO unit 12a writes the subsequently inputted ID data "a46" into the memory 12g write address 1=6 region. In this way, the FIFO unit 12a writes the inputted IQ data into the memory 12g.

Similarly, the FIFO unit 12a writes the OFDM symbol head IQ data "a48" into the memory 12d write address 2=4 region. From this point, the FIFO unit 12a subsequently writes the inputted data into the memory 12d write address 2 regions. However, the memory 12d is an offset length portion region, that is, a region that may store 64 pieces of data. Therefore, the FIFO unit 12a writes the IQ data "a43" into the memory 12d write address 2=63 region, and then overwrites the subsequent IQ data "a44" into the memory 12d write address 2=0 region. In this way, the FIFO unit 12a writes the inputted IQ data into the memory 12d.

The comparing unit 12e compares the IQ data written by the FIFO unit 12a into the memory 12g with the read data 2 read from the memory 12d using the read address 2. Since the read address 2 is created by the adding unit 12c by adding the offset value to the write address 2, the read address 2 is not created until the offset length portion is written into the IQ data memory 12d, that is, until the data is written into the write address 2=62 region. Therefore, the read address 2 becomes 0 when the write address 2=63, the read address 2 becomes 0 when the write address 2=1, and the read address 2 becomes 1 when the write address 2=2. The adding unit 12c creates the read address 2 when the relationship with the write address 2 becomes the above relationship.

In this way, the comparing unit 12e compares the IQ data written into the memory 12d write address 2 regions with the IQ data read out from the memory 12d with the read address 2. For example, the comparing unit 12e compares the IQ data "a47" written into the memory 12d write address 2=3 region with the IQ data "x" read out from the memory 12d with the read address 2=4.

When the comparison is conducted in this way, the comparing unit 12e detects that the IQ data "a48" written into the write address 2=4 region matches the IQ data "a48" read out at the read address 2=5, and thus makes the number of detections "1". Specifically, the comparing unit 12e detects the beginning of the IQ data that is the source of the CP. Next, the comparing unit 12e detects that the IQ data written into the write address 2=5 region to write address 2=19 region matches the IQ data read out from the read address 2=5 region to the read address 2=20 region, and counts up to the CP length portion of "16". Specifically, the comparing unit 12e detects the end of the IQ data that is the source of the CP.

The comparing unit 12e then outputs the enable signal to the retaining unit 12h when the count has reached the CP length portion of "16." The retaining unit 12*h* retains the write address 1=84 created by the counter 12*f* at the timing when the enable signal is received. Specifically, the retaining unit 12*h* retains the write address 1 which stores the OFDM symbol beginning. In other words, the retaining unit 12*h* detects the OFDM symbol beginning written into the memory 12*g* and delayed by the REC 10 internal delay amount.

The adding unit 12*i* outputs to the counter 12*j* the load enable that indicates a timing in which the delay amount, which is derived by subtracting the optical cable length delay and RE internal delay from the maximum delay amount of the entire system, is added to the reference signal (frame).

The counter 12*j* reads out the IQ data "b48" from the memory 12*g* as a read address of the write address 1=84 retained by the retaining unit 12*h*, at the load enable timing specified by the adding unit 12*i*. In this way, the counter 12*j* sequentially reads out the IQ data from the memory 12*g* with the write address 1=84 as the beginning. By doing so, the delay adjusting unit 12 may determine a transmission timing of the OFDM symbols that have absorbed the cable delay amount and the RE internal delay amount, after the reference signal with the specific cycle of the transmission timing of the OFDM symbol beginning.

[Specific Example (Process Flow)]

Figure 5:
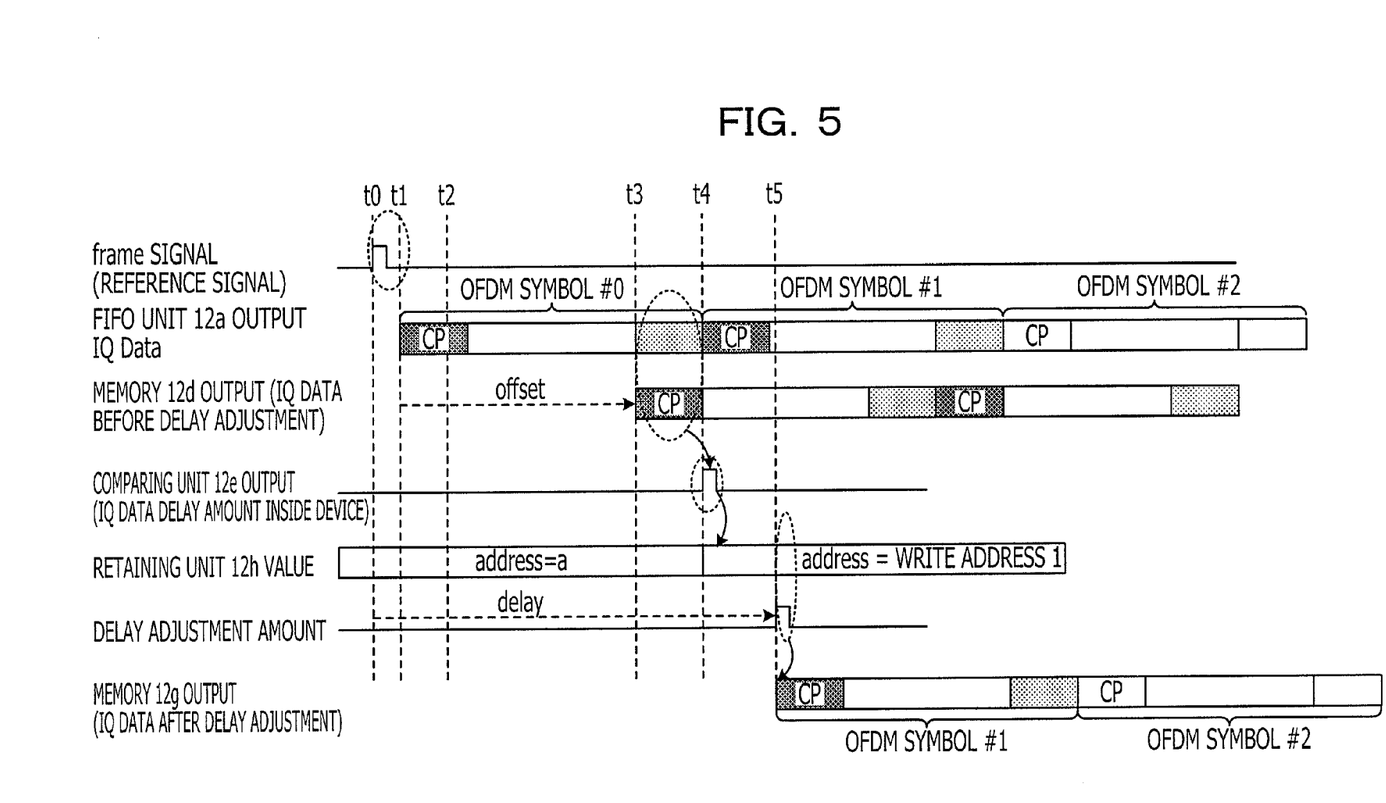
FIG. 5 illustrates a flow of delay adjusting processing according to the first embodiment.

Next, an overall flow will be explained with reference to FIG. 5. FIG. 5 illustrates a flow of delay adjusting processing according to the first embodiment. As illustrated in FIG. 5, the reference signal start is set at a time t0. A time in which the beginning IQ data is written into the memory 12*d* and the memory 12*g* by the FIFO unit 12*a* is set as a time t1.

Next, at a time t3, the comparing unit 12*e* detects that the IQ data read out from the memory 12*d* matches the IQ data written into the memory 12*d* and the memory 12*g*. At a time t4, the number of times the comparing unit 12*e* detects a match becomes the CP length portion.

The retaining unit 12*h* then retains the write address 1 at the time t4. The counter 12*j* makes the write address 1 retained by the retaining unit 12*h* and adjusted by the delay adjustment amount by the adding unit 12*i* the beginning, and data is read out in order from the memory 12*g*. As a result, the delay adjusting unit 12 may accurately detect and read out the OFDM symbol beginning IQ data not synchronized with the reference signal, from the memory 12*g*.

[Effects of the First Embodiment]

The radio base station 1 according to the first embodiment directly extracts an OFDM symbol beginning from the IQ data after baseband signal processing without using a PLL or without using a measure of adding a control signal to indicate the beginning of a frame, thus allowing the absorption of phase fluctuations. Moreover, signal processing functional units other than a CPRI terminal unit inside the REC may use a clock with any frequency. Additionally, the radio base station 1 may exhibit improved reliability and stability since digital circuit processing is possible without using an analog circuit such as a PLL.

Embodiment 2

The radio base station according to the first embodiment has been described as retaining a timing of one detection of an OFDM symbol boundary and then adjusting for the delays inside the REC as an example; however, the radio base station is not limited as such. For example, the disclosed radio base station may improve the accuracy the OFDM symbol transmission timing after the delay adjustment by using a timing in which the OFDM symbol boundary is detected a specific number of times to adjust the delays inside the REC.

Thus, the second embodiment describes an example in which a timing of detecting the OFDM symbol boundary a specific number of times is used as the REC internal delay amount. A radio base station configuration, a circuit configuration example, and a time chart will be described. The overall configuration of the system is similar to the one described in the first embodiment.

[Radio Base Station Configuration]

Figure 6:
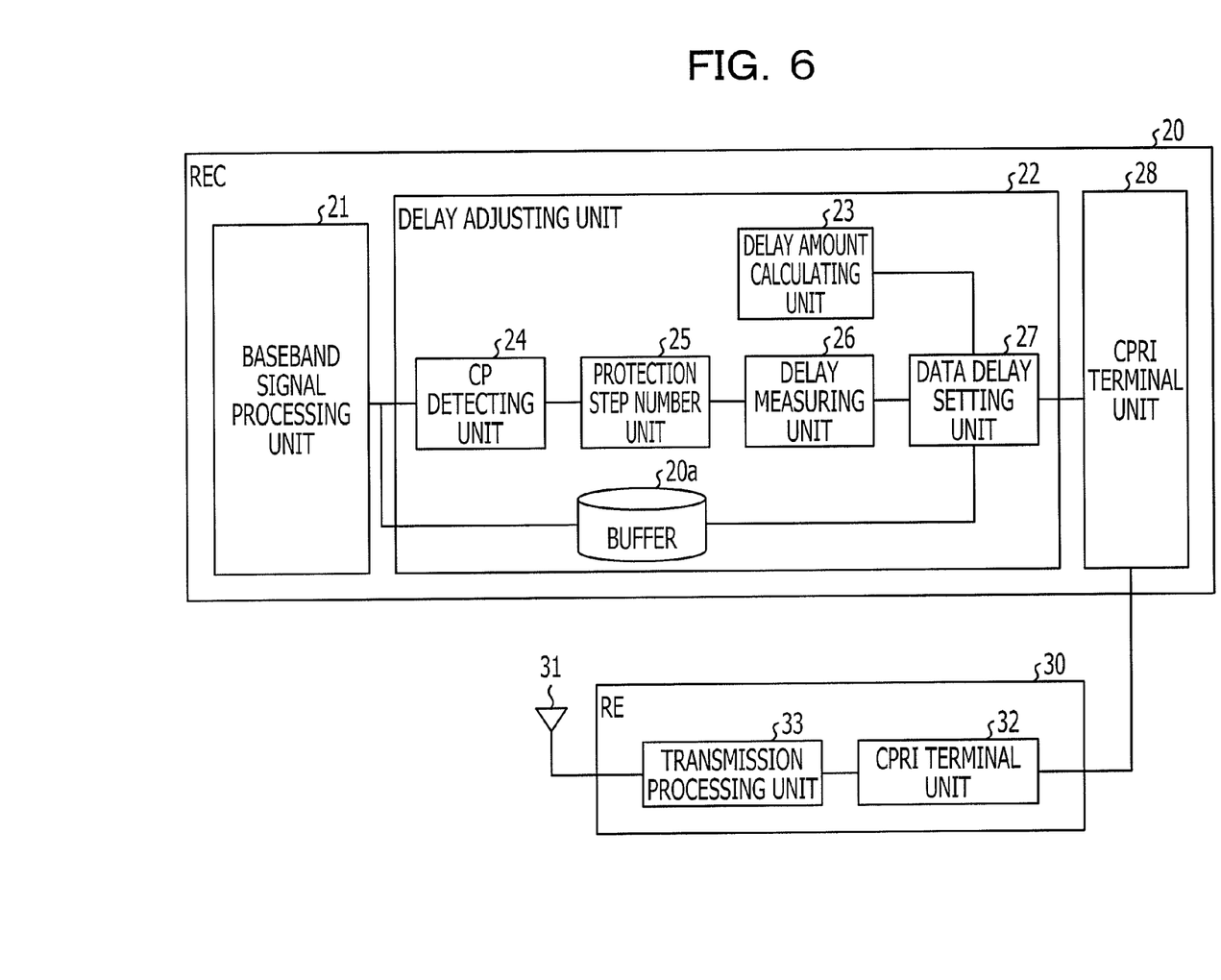
FIG. 6 is a block diagram of a configuration of the radio base station according to a second embodiment.

FIG. 6 is a block diagram of a configuration of the radio base station according to the second embodiment. As illustrated in FIG. 6, the radio base station 1 includes a REC 20 and the REs. The REs have configurations similar to the RE 30 described in FIG. 2, and thus explanations thereof will be omitted.

[REC Configuration]

As illustrated in FIG. 6, the REC 20 includes a baseband signal processing unit 21, a delay adjusting unit 22, and a CPRI terminal unit 28. The control units described herein are merely examples and other control units and memory units may be included. The baseband signal processing unit 21 has a similar configuration to the baseband signal processing unit 11 illustrated in FIG. 2, and the CPRI terminal unit 28 has a similar configuration to the CPRI terminal unit 17 illustrated in FIG. 2, and therefore detailed descriptions thereof will be omitted.

The delay adjusting unit 22 is a processing unit that adjusts a delay amount that includes internal delays of the REC 10, internal RE delays, and cable delays and the like, of the OFDM symbol created by the baseband signal processing unit 21. The delay adjusting unit 22 includes a buffer 20*a*, a delay amount calculating unit 23, a CP detecting unit 24, a protection step number unit 25, a delay amount measuring unit 26, and a data delay setting unit 27. The delay adjusting unit 22 receives a global positioning system (GPS) radio frame and the like to create a reference signal synchronized with the radio frame.

The buffer 20*a* is a storage unit that subsequently retains data from OFDM symbol beginning data in the same way as the buffer 10*a* illustrated in FIG. 2. For example, the buffer 20*a* has a region that may retain a maximum delay amount portion, and retains in order the OFDM symbol beginning IQ data outputted by the baseband signal processing unit 21.

The delay amount calculating unit 23 calculates a delay amount by subtracting an internal delay amount of the RE 30 and a delay amount of the cable connecting the REC 20 and the RE 30 from a given maximum delay amount in the same way as the delay amount calculating unit 13 illustrated in FIG. 2.

The CP detecting unit 24 detects a CP from downlink IQ sampling data in the same way as the CP detecting unit 14 illustrated in FIG. 2. The CP detecting unit 24 then outputs the detection result to the protection step number unit 25. The method of detection is the same as that of the first embodiment, and a detailed description thereof will be omitted.

The protection step number unit 25 determines that there are CPs when CP intervals detected by the CP detecting unit 24 continuously match all of the OFDM symbol lengths. For example, the protection step number unit 25 counts the number of protection steps when the number of detections of the CP source IQ data by the CP detecting unit 24 becomes the CP length portion, and when the number of detections of the CP source IQ data is detected at the end of the OFDM symbol length portion after the previous CP length portion. The protection step number unit 25 then outputs the timing at which the counted number of protection steps becomes a specific value to the data delay setting unit 26.

For example, the protection step number unit 25 detects that the number of times the CP source IQ data is detected and reported by the CP detecting unit 24 has become a CP length portion of "16." Furthermore, the protection step number unit 25 counts the number of protection steps when the time of the detection is after the time that the OFDM symbol length portion of "80" units of IQ data is inputted into the buffer 20a, after the previous CP length portion IQ data is detected.

Specifically, when the (1) OFDM symbol length portion IQ data input, and (2) the CP length portion CP source data detection occur, the protection step number unit 25 determines that the detection of (2) is correct and then counts the number of protection steps. The protection step number unit 25 then reports the OFDM symbol beginning after the above (1) and (2) are detected a specific number of times to the delay measuring unit 26.

Returning to FIG. 6, the delay measuring unit 26 determines a delay amount, that is, a fluctuation, created by the baseband signal processing unit 21 for the time until the OFDM symbol beginning is reported by the protection step number unit 25. The delay measuring unit 25 then outputs the detected OFDM symbol beginning to the data delay setting unit 26.

The data delay setting unit 27 adds the OFDM symbol delay amounts so that the transmission timing after the delay amount measured by the delay measuring unit 25, the optical cable delay amount, and the RE internal delay amount are added together becomes fixed as the system maximum delay amount in the RE terminals, in the same way as the data delay setting unit 16 illustrated in FIG. 2.

The CPRI terminal unit 28 converts the delay adjusted OFDM symbols received from the data delay setting unit 27 to optical signals and transmits the optical signals to the RE 30 in the same way as the CPRI terminal unit 17 illustrated in FIG. 2.

[Exemplary Circuit Configuration of Delay Processing Unit]

Figure 7:
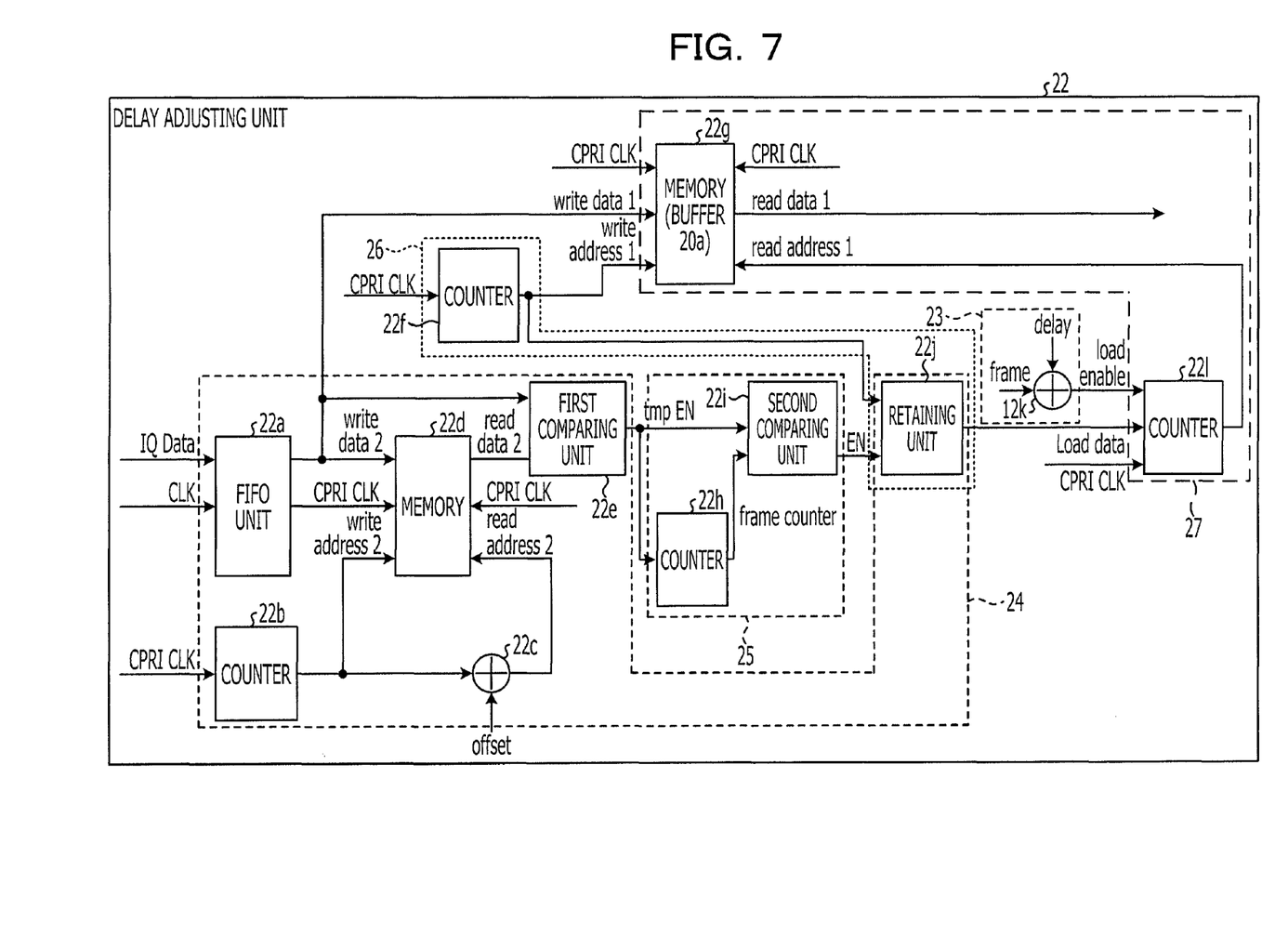
FIG. 7 is an exemplary circuit configuration of a REC delay adjusting unit according to the second embodiment.

Next, a flow of data and an exemplary circuit configuration of the delay adjusting unit 22 illustrated in FIG. 6 will be described with reference to FIG. 7. FIG. 7 is an exemplary circuit configuration of the REC delay adjusting unit according to the second embodiment. As illustrated in FIG. 7, the delay adjusting unit 22 includes a FIFO unit 22a, a counter 22b, an adding unit 22c, a memory 22d, a first comparing unit 22e, a counter 22f, and a memory 22g. Further, the delay adjusting unit includes a counter 22h, a second comparing unit 22i, a retaining unit 22j, an adding unit 22k, and a counter 22l.

The delay amount calculating unit 23 illustrated in FIG. 6 corresponds to the adding unit 22k. Similarly, the CP detecting unit 24 corresponds to the FIFO unit 22a, the counter 22b, the memory 22d, the first comparing unit 22e, and the retaining unit 22j. Similarly, the protection step number unit 25 corresponds to the counter 22h and the second comparing unit 22i. The delay measuring unit 26 corresponds to the counter 22f and the retaining unit 22j. The data delay setting unit 27 corresponds to the memory 22g and the counter 22l.

The FIFO unit 22a, the counter 22b, and the adding unit 22c illustrated in FIG. 7 have configurations similar to the FIFO unit 12a, the counter 12b, and the adding unit 12c illustrated in FIG. 3, and therefore detailed descriptions thereof will be omitted. Similarly, the memory 22d, the counter 22f, and the memory 22g illustrated in FIG. 7 have configurations similar to the memory 12d, the counter 12f, and the memory 12g illustrated in FIG. 3, and therefore detailed descriptions thereof will be omitted.

The first comparing unit 22e continuously compares the CP length portion data to determine matches and non-matches to detect the OFDM symbol CP and identify the OFDM symbol boundaries in the same way as the comparing unit 12e illustrated in FIG. 3. A point of difference with the comparing unit 12e however is that the first comparing unit 22e outputs a tmp enable signal=1 that indicates a detection of a match to the counter 22h and the second comparing unit 22i.

The counter 22h is a counter that counts OFDM symbol length portions, and makes the tmp enable signal from the first comparing unit 22e a load enable with a count value of 0, and then sequentially counts the tmp enable signals. For example, the counter 22h makes the count value 0 when the enable signal=1 is received from the first comparing unit 22e. The counter 22h also outputs a count value counted in synchronization with the CPRI CLK to the second comparing unit 22i.

The second comparing unit 22i counts the protection steps when the count value of the counter 22h is a value in which the OFDM symbol length is terminated, and when the tmp enable signal=1. The following example will be described based on the OFDM symbol being "8." The count value starts from 0. In this case, the second comparing unit 22i increments the protection step number when the count value of the counter 22h is 7 at the time when the tmp enable signal=1 is received. Conversely, the second comparing unit 22i resets the protection step number by making the protection step number 0 when the count value of the counter 22h is a number other than 7 at the time when the tmp enable signal=1 is received. The second comparing unit 22i then outputs the enable signal to the retaining unit 22j when the counted protection step number becomes a specific value.

The retaining unit 22j retains the write address 1 of the memory 22g received from the counter 22f at the time that the enable signal is received from the second comparing unit 22e. The retained address becomes the address storing the OFDM symbol beginning data. The retaining unit 22j outputs the retained write address 1 to the counter 22l as load data.

The adding unit 22k has the same functions as the adding unit 12i illustrated in FIG. 3, and the counter 22l has the same functions as the counter 12j illustrated in FIG. 3, and therefore detailed explanations thereof will be omitted.

[Specific Example (Time Chart)]

Figure 8:
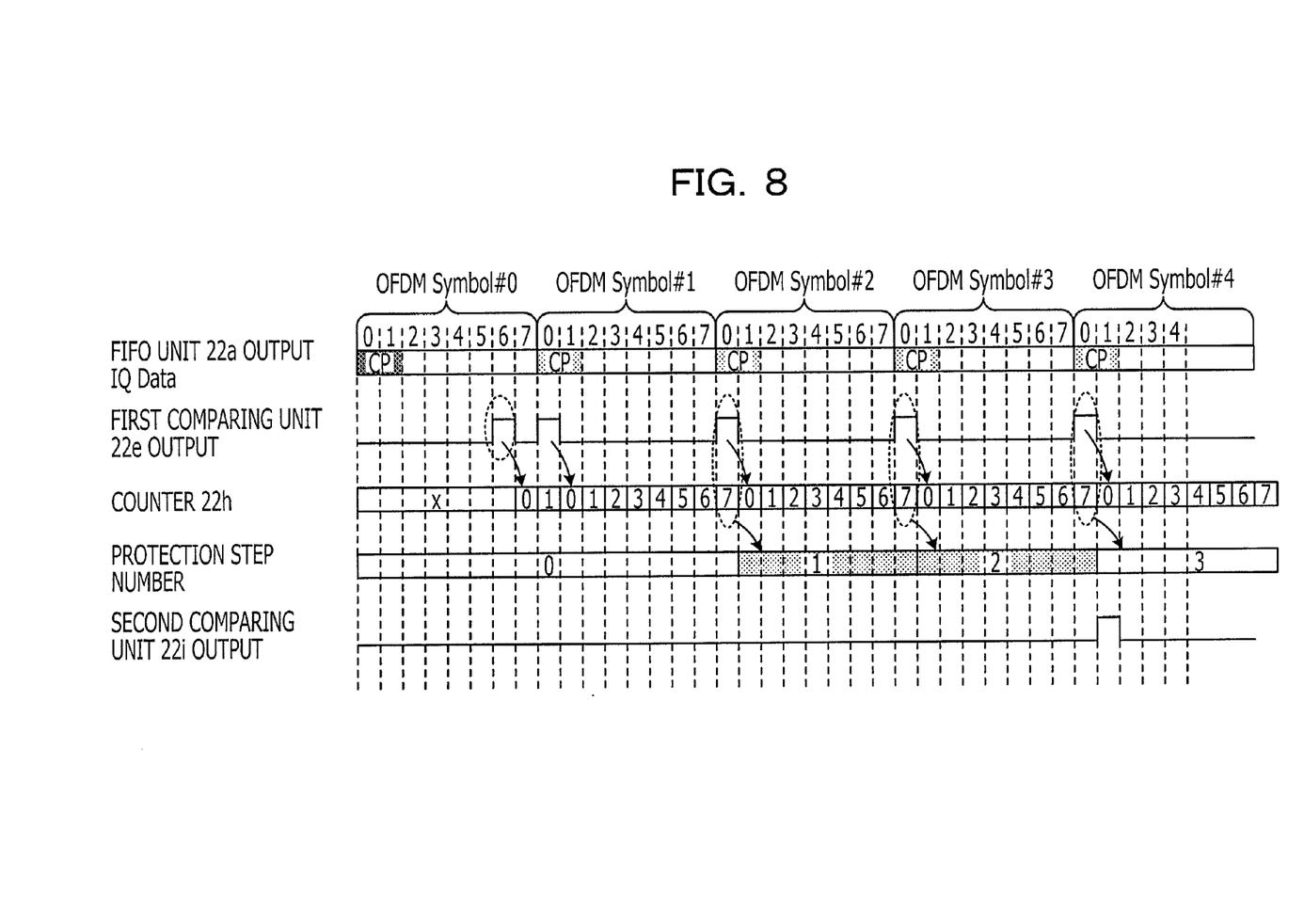
FIG. 8 is a time chart of delay adjusting processing according to the second embodiment.

Next, a detailed explanation of processing conducted by the delay adjusting unit 22 of the REC 20 will be described with reference to the exemplary circuit illustrated in FIG. 7. FIG. 8 is a time chart of the delay adjusting processing according to the second embodiment. In this example, the OFDM symbol length is 8 and the CP length is 2. Thus the counter 22h is an octal counter.

As illustrated in FIG. 8, the FIFO unit 22a receives IQ data from the baseband signal processing unit 21 and outputs the IQ data to the memory 22d, the first comparing unit 22e, and the memory 22g in order from the OFDM symbol beginning IQ data of "0."

Next, the first comparing unit 22e detects the OFDM symbol #0 IQ data "6" as a CP. Specifically, the first comparing unit 22e detects the OFDM symbol #0 IQ data "6" as the OFDM symbol #1 beginning IQ data, that is, a CP, and then outputs the enable signal=1 to the counter 22h.

The counter 22h starts counting after resetting the count value upon the enable signal=1 being received from the first comparing unit 22e. In other words, the counter 22h starts to count from the count value=0 at the time when the OFDM symbol #0 IQ data "7" from the FIFO unit 22a is detected.

Next, the first comparing unit 22e detects the OFDM symbol #0 IQ data "0" as a CP, and outputs the enable signal=1 to the counter 22h. The counter 22h resets the counter at this time. The second comparing unit 22i does not count the protection step number since there are two counter 22h count values "0" and "1" up to the time the enable signal=1 is received, and thus the OFDM symbol number "8" does not match. That is, the second comparing unit 22*i* determines that the CP detected first is a false detection.

Next, the first comparing unit 22*e* detects the OFDM symbol #2 IQ data "0" as a CP, and outputs the enable signal=1 to the counter 22*h*. The counter 22*h* resets the counter at this time. The second comparing unit 22*i* counts the protection step number and makes the protection step=1 since there are eight counter 22*h* count values "0" to "7" up to the time the enable signal=1 is received, and thus the OFDM symbol number "8" matches.

Next, the first comparing unit 22*e* detects the OFDM symbol #3 IQ data "0" as a CP, and outputs the enable signal=1 to the counter 22*h*. The counter 22*h* resets the counter at this time. The second comparing unit 22*i* counts the protection step number and makes the protection step=2 since there are eight counter 22*h* count values "0" to "7" up to the time the enable signal=1 is received, and thus the OFDM symbol number "8" matches.

The second comparing unit 22*i* then outputs the enable signal to the retaining unit 22*j* when the value of the number of protection steps counted by the counter 22*h* reaches the specific value of "2".

[Effects of the Second Embodiment]

In this way, the radio base station 1 according to the second embodiment reduces the false detection probability of OFDM symbols through the false detection of CPs since the internal delay amounts of the REC may be adjusted by the detection of multiple OFDM symbol boundaries. As a result, the accuracy of the transmission timing for transmitting OFDM symbols after the delay adjustments may be improved.

Embodiment 3

The descriptions in the first and second embodiments used examples in which the internal delay amounts of the REs and the delay amounts of the cables connecting the REC and the REs stay the same; however the present disclosure is not limited as such. The radio base station disclosed herein may be applied in cases where the internal delay amounts of the REs and the delay amounts of the optical cables are not changed.

A radio base station disclosed according to a third embodiment will be described using an example in which the internal delay amounts of the REs and the delay amounts of the optical cables are not changed.

Figure 9:
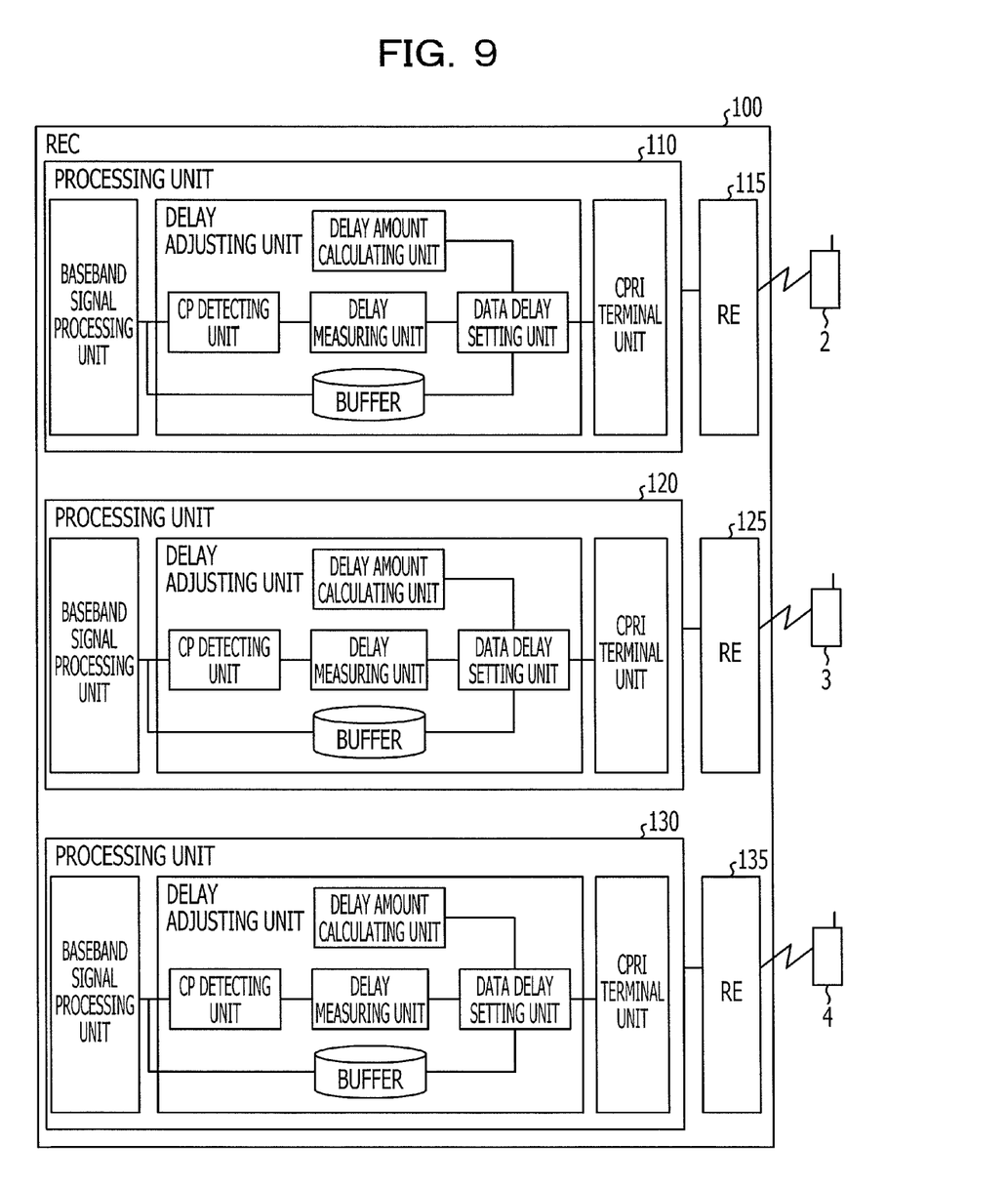
FIG. 9 illustrates an overall configuration of a system including a radio base station according to a third embodiment.

FIG. 9 illustrates an overall configuration of a system including a radio base station according to the third embodiment. As illustrated in FIG. 9, the system is configured of a radio base station 1 and mobile terminals 2 to 4 that are communicably connected by radio. The radio base station 1 includes an REC 100, RE 115, RE 125, and RE 135. The REC 100 and the RE are devices that conform to CPRI and are connected by optical cables.

The difference with the first embodiment is that delay amounts in which OFDM symbols are delayed inside the optical cables connecting the REC 100 and the REs are assumed to not be changed, and delay amounts in which OFDM symbols are delayed inside each RE are also assumed not to be changed.

The REC 100 includes processing units 110, 120, and 130 which conduct delay adjusting for each of the REs. Specifically, the processing unit 110 of the REC 100 is connected to the RE 115, and adjusts internal delay amounts inside the REC 100, internal delay amounts inside the RE 115, and optical cable delay amounts. Similarly, the processing unit 120 of the REC 100 is connected to the RE 125, and adjusts internal delay amounts inside the REC 100, internal delay amounts inside the RE 125, and optical cable delay amounts.

Similarly, the processing unit 130 of the REC 100 is connected to the RE 135, and adjusts internal delay amounts inside the REC 100, internal delay amounts inside the RE 135, and optical cable delay amounts.

The REC 100 may include processing units for each antenna having an RE as opposed to having processing units for each RE, thus allowing adjustments of delay amounts for each antenna. In this case, the REC 100 may be connected to the RE 115 and two processing units if, for example, the RE 115 has two antennas.

The processing units included in the REC 100 each include a baseband signal processing unit, a delay adjusting unit, and a CPRI terminal unit, and each processing unit has a similar configuration to the one illustrated in FIG. 2. The circuit configurations of the delay adjusting units are similar to those illustrated in FIGS. 3 and 7. However, the configurations are not necessarily similar to that of FIG. 2, and may be, for example, similar to that of FIG. 6. Moreover, the configurations illustrated in FIGS. 2 and 6 may be combined inside the REC 100.

The REC 100 having the above configuration creates an OFDM symbol adjusted for delays for the RE 115, the RE 125, and the RE 135, so that the OFDM symbols are transmitted from the REs at the same time. Processing conducted by each of the processing units is similar to the processing described in FIGS. 1 to 5.

Figure 10:
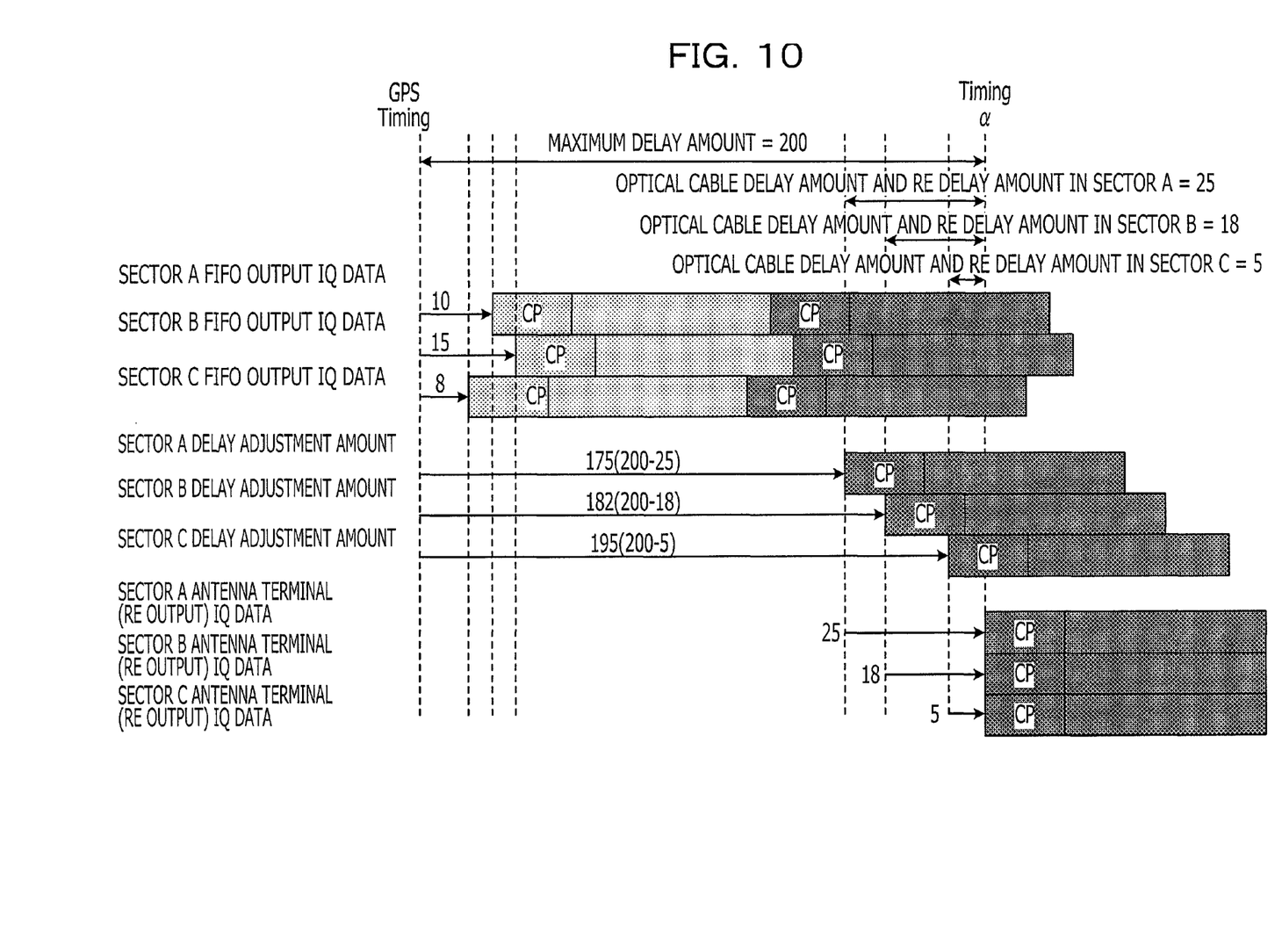
FIG. 10 illustrates a detailed example of delays during and after adjusting according to the third embodiment.

Next, a detailed explanation of delay adjusting according to the third embodiment will be described. FIG. 10 illustrates a detailed example of delays during and after adjusting according to the third embodiment. The maximum delay amount is assumed to be 200, the delay amount of the RE 115 internal delay and the optical cable length delay is assumed to be 25, the delay amount of the RE 125 internal delay and the optical cable length delay is assumed to be 18, and the delay amount of the RE 135 internal delay and the optical cable length delay is assumed to be 5. The delay amounts may be described in units of ms for example.

Under these conditions as illustrated in FIG. 10, the processing unit 110 employs the methods described in the first and second embodiments to detect an OFDM symbol beginning destined for the RE 115 at a buffer position that is delayed by 10 after a reference signal. Next, the processing unit 110 calculates a delay amount of 175 by subtracting the RE 115 internal delay amount and the optical cable length delay amount of 25 from the maximum delay amount. The processing unit 110 then outputs the OFDM symbol adjusted by the calculated delay amounts of 10 and 175 based on the detected OFDM symbol beginning, to the RE 115.

Similarly, the processing unit 110 detects an OFDM symbol beginning destined for the RE 125 at a buffer position that is delayed by 15 after the reference signal. Next, the processing unit 110 calculates a delay amount of 182 by subtracting the RE 125 internal delay amount and the optical cable length delay amount of 18 from the maximum delay amount. The processing unit 110 then outputs the OFDM symbol adjusted by the calculated delay amounts of 15 and 182 based on the detected OFDM symbol beginning, to the RE 125.

Similarly, the processing unit 110 detects an OFDM symbol beginning for the RE 135 at a buffer position that is delayed by 8 after the reference signal. Next, the processing unit 110 calculates a delay amount of 195 by subtracting the RE 135 internal delay amount and the optical cable length delay amount of 5 from the maximum delay amount. The processing unit 110 then outputs the OFDM symbol adjusted by the calculated delay amounts of 8 and 195 based on the detected OFDM symbol beginning, to the RE 135.

In this way, the processing units may individually detect OFDM symbol beginnings for each RE and individually adjust the delay amounts. Therefore, the OFDM symbols may be transmitted at the same timing (timing α) from each RE even when the delay amounts in each RE differ and when the optical cable delay amounts differ.

Embodiment 4

The present disclosure may be implemented in various different modes other than the embodiments of the present disclosure described above. The following describes a different embodiment.

[Application for RE]

Examples in which a delay adjusting unit is provided in the REC is described in the above embodiments; however the present disclosure is not limited as such. For example, a delay adjusting unit may be provided in an RE device. In this case, the delay amount of the cable between the REC device and the RE device and the REC internal delay amount is absorbed at the time that the RE device receives the OFDM symbols from the REC device. Specifically, a cable delay amount of 0 and a RE internal delay amount of 0 are calculated by the delay amount calculating unit as described in the above embodiments. The delay amount calculated by the delay processing unit in the RE device then becomes the RE device internal delay amount.

[System]

Among the processing described in the present embodiment, all or some of the processing described as being conducted automatically may be conducted manually. Conversely, all or some of the processing described as being conducted manually may be conducted automatically using known methods. The procedures, the control procedures, the specific names, and information including various kinds of data and parameters, such as those illustrated in FIG. 3, that have been described in the specification and illustrated in the drawings may be altered, unless specified in particular.

The constituent elements of the illustrated parts are functional and conceptual perspectives and do not have to be configured physically as illustrated. That is, the decentralization and integration of the components, such as for example the CP detecting unit 14 and the delay measuring unit 15, are not limited to those illustrated in the drawings. That is, all or some of the components may be functionally or physically decentralized or integrated according to each kind of load and usage. All or a part of the processing functionality implemented by the components may be performed by a CPU and a program that is analyzed and executed by the CPU, or may be implemented as hardware with wired logic.

The processing of the various functions described in the present embodiment may be realized by executing a program prepared in advance using a computer such as a personal computer or a workstation. Such a program may be distributed to the computer through a communication network such as the Internet and the like. Furthermore, the program may be recorded on a hard disk, a flexible disk (FD), a CD-ROM, an MO, a DVD or another type of computer-readable recording medium so that the program may be executed by being read from the recording medium by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio equipment controller comprising:
a calculator that calculates a delay amount by subtracting from a given maximum delay amount an internal delay amount of a radio equipment and a delay amount of a cable, the radio equipment modulating and transmitting orthogonal frequency division multiplexing (OFDM) symbols, and the cable connecting the radio equipment and the radio equipment controller that creates the OFDM symbols;
a detector that detects a beginning of the OFDM symbols from data that is inputted into a buffer that stores data of the OFDM symbols; and
a delay controller that determines a transmission timing of the OFDM symbols so that the transmission timing of the beginning of the OFDM symbols becomes a timing that is delayed by the calculated delay amount after a reference signal with a specific period, wherein
the detector compares data stored in the buffer with data derived from the data stored in the buffer being delayed by a specific offset length, and detects, as the OFDM symbol beginning, data stored in the buffer subsequent to the last data that matches when data that matches is a cyclic prefix (CP) length portion.

2. The radio equipment controller according to claim 1 further comprising:
a storage controller that sequentially stores the OFDM symbol data in the buffer and sequentially stores the data in a second buffer having an offset length region with the CP removed from the OFDM symbols; wherein
the detector compares the data stored in the second buffer with data derived from the data stored in the second buffer being delayed by the offset length, and
the delay controller makes a write address an initial value, the write address being written into the buffer at a time when the data detected as matching in the comparing becomes the CP length portion, and makes data read out from the initial value the OFDM symbol beginning to determine the OFDM symbol transmission timing.

3. The radio equipment controller according to claim 2 wherein,
the delay controller makes a write address an initial value, the write address being written into the buffer at a time when the OFDM symbol CP length portion data detected continuously a specific number of times is last detected, to determine the OFDM symbol transmission timing.

4. A radio control method comprising:
calculating a delay amount by subtracting from a given maximum delay amount an internal delay amount of a radio equipment and a delay amount of a cable, the radio equipment modulating and transmitting orthogonal frequency division multiplexing (OFDM) symbols, and the cable connecting the radio equipment and the radio equipment controller that creates the OFDM symbols;
detecting a beginning of the OFDM symbols from data that is inputted into a buffer that stores data of the OFDM symbols; and
determining a transmission timing of the OFDM symbols so that the transmission timing of the beginning of the OFDM symbols becomes a timing that is delayed by the calculated delay amount after a reference signal with a specific period, wherein the detecting includes comparing data stored in the buffer with data derived from the data stored in the buffer being delayed a specific offset length, and detecting, as the OFDM symbol beginning, data stored in the buffer subsequent to the last data that matches when data that matches is a cyclic prefix (CP) length portion.

5. The radio control method according to claim 4, wherein
the OFDM symbol data in the buffer is sequentially stored, and the data in a second buffer having an offset length region with the CP removed from the OFDM symbols is sequentially stored;
the detecting includes comparing the data stored in the second buffer with data derived from the data stored in the second buffer being delayed by the offset length; and
the determining includes making a write address an initial value, the write address being written into the buffer at a time when the data detected as matching in the comparing becomes the CP length portion, and making data read out from the initial value the OFDM symbol beginning, to determine the OFDM symbol transmission timing.

6. The radio control method according to claim 5, wherein
the determining includes making a write address an initial value, the write address written into the buffer at a time when the OFDM symbol CP length portion data detected continuously a specific number of times is last detected, to determine the OFDM symbol transmission timing.

7. A radio station comprising:
a radio equipment controller that creates orthogonal frequency division multiplexing (OFDM) symbols, and
a radio equipment that modulates and transmits the OFDM symbols, wherein
the radio equipment controller includes
a calculator that calculates a delay amount by subtracting an internal delay amount in the radio equipment and a delay amount of a cable connecting the radio equipment and the radio equipment controller, from a given maximum delay amount;
a detector that detects a beginning of the OFDM symbols from data that is inputted into a buffer that stores data of the OFDM symbols; and
a delay controller that determines a transmission timing of the OFDM symbols so that the transmission timing of the beginning of the OFDM symbols becomes a timing that is delayed by the calculated delay amount after a reference signal with a specific period, wherein
the detector compares data stored in the buffer with data derived from the data stored in the buffer being delayed by a specific offset length, and detects, as the OFDM symbol beginning, data stored in the buffer subsequent to the last data that matches when data that matches is a cyclic prefix (CP) length portion.

8. The radio station according to claim 7, further comprising:
a storage controller that sequentially stores the OFDM symbol data in the buffer and sequentially stores the data in a second buffer having an offset length region with the CP removed from the OFDM symbols; wherein
the detector compares the data stored in the second buffer with data derived from the data stored in the second buffer being delayed by the offset length, and
the delay controller makes a write address an initial value, the write address being written into the buffer at a time when the data detected as matching in the comparing becomes the CP length portion, and makes data read out from the initial value the OFDM symbol beginning, to determine the OFDM symbol transmission timing.

9. The radio station according to claim 8, wherein
the delay controller makes a write address an initial value, the write address being written into the buffer at a time when the OFDM symbol CP length portion data detected continuously a specific number of times is last detected, to determine the OFDM symbol transmission timing.

10. A radio communication system comprising:
a radio base station including a radio equipment controller that creates orthogonal frequency division multiplexing (OFDM) symbols and a radio equipment that modulates and transmits the OFDM symbols,
and a mobile terminal that communicates with the radio base station; wherein
the radio base station comprises:
a calculator that calculates a delay amount by subtracting an internal delay amount in the radio equipment and a delay amount of a cable connecting the radio equipment and the radio equipment controller, from a given maximum delay amount;
a detector that detects a beginning of the OFDM symbols from data that is inputted into a buffer that stores data of the OFDM symbols; and
a delay controller that determines a transmission timing of the OFDM symbols so that the transmission timing of the beginning of the OFDM symbols becomes a timing that is delayed by the calculated delay amount after a reference signal with a specific period, wherein
the detector compares data stored in the buffer with data derived from the data stored in the buffer being delayed by a specific offset length, and detects, as the OFDM symbol beginning, data stored in the buffer subsequent to the last data that matches when data that matches is a cyclic prefix (CP) length portion.

11. The radio communication system according to claim 10 wherein,
the mobile terminal includes a receiving unit that receives the detected OFDM symbols at the determined transmission timing.

12. The radio communication system according to claim 10, further comprising:
a storage controller that sequentially stores the OFDM symbol data in the buffer and sequentially stores the data in a second buffer having an offset length region with the CP removed from the OFDM symbols; wherein
the detector compares the data stored in the second buffer with data derived from the data stored in the second buffer being delayed by the offset length, and
the delay controller makes a write address an initial value, the write address being written into the buffer at a time when the data detected as matching in the comparing becomes the CP length portion, and makes data read out from the initial value the OFDM symbol beginning to determine the OFDM symbol transmission timing.

13. The radio communication system according to claim 12, wherein
the delay controller makes a write address an initial value, the write address being written into the buffer at a time when the OFDM symbol CP length data detected continuously a specific number of times is last detected, to determine the OFDM symbol transmission timing.

* * * * *